United States Patent
Zhang et al.

(10) Patent No.: US 8,136,655 B2
(45) Date of Patent: Mar. 20, 2012

(54) HEAT RESISTANT CONVEYOR BELT WITH SIDE WALLS

(75) Inventors: Dun Zhang, Qingdao (CN); Chengcal Sun, Qingdao (CN)

(73) Assignee: Qingdao Rubber Six Group Co., Ltd., Qingdao, Shandong Province (CN)

( * ) Notice: Subject to any disclaimer, the term of this patent is extended or adjusted under 35 U.S.C. 154(b) by 328 days.

(21) Appl. No.: 11/887,147

(22) PCT Filed: Aug. 3, 2006

(86) PCT No.: PCT/CN2006/001950
§ 371 (c)(1),
(2), (4) Date: Sep. 26, 2007

(87) PCT Pub. No.: WO2007/036121
PCT Pub. Date: Apr. 5, 2007

(65) Prior Publication Data
US 2009/0266685 A1    Oct. 29, 2009

(30) Foreign Application Priority Data
Sep. 29, 2005  (CN) .................. 2005 2 0128631 U

(51) Int. Cl.
B65G 15/44        (2006.01)
A01D 43/02        (2006.01)
(52) U.S. Cl. ........ 198/822; 198/699; 198/711; 198/850; 56/364

(58) Field of Classification Search ................ 198/699, 198/822, 711
See application file for complete search history.

(56) References Cited

U.S. PATENT DOCUMENTS

| | | | | |
|---|---|---|---|---|
| 2,685,958 A | * | 8/1954 | White | 198/836.1 |
| 2,987,169 A | * | 6/1961 | Hinchcliffe | 198/699 |
| 3,100,566 A | * | 8/1963 | Hinchcliffe | 198/699 |
| 4,202,159 A | * | 5/1980 | Young | 56/364 |
| 4,203,277 A | * | 5/1980 | Kaetzel | 56/377 |
| 4,325,478 A | * | 4/1982 | Richard | 198/699 |
| 6,024,209 A | * | 2/2000 | Nolte | 198/711 |

FOREIGN PATENT DOCUMENTS

| | | | |
|---|---|---|---|
| DE | 3247696 A | * | 6/1984 |
| DE | 3247696 A1 | * | 6/1984 |
| GB | 1104437 A | | 2/1968 |
| GB | 1104437 A | * | 2/1968 |

* cited by examiner

*Primary Examiner* — Gene Crawford
*Assistant Examiner* — Yolanda Cumbess
(74) *Attorney, Agent, or Firm* — Fliesler Meyer LLP

(57) ABSTRACT

The heat resistant conveyer belt with side walls according to the invention aims at solving such a prior technical problem that cleats and skirt-boards easily get loose from a base belt. The conveyer belt of the invention comprises a base belt and cleats positioned on the base belt, wherein the conveyer belt is provided with metal frameworks embedded in the cleats and the cleats are fixed on the base belt through fasteners. The cleats and the skirt-boards are respectively embedded with metal frameworks within, so that they can be fixed on the base belt through fasteners, thereby preventing from getting loose from the base belt and increasing the life time of the conveyer belt and reducing its cost.

8 Claims, 1 Drawing Sheet

HEAT RESISTANT CONVEYOR BELT WITH SIDE WALLS

This application is a U.S. national stage application of PCT/CN2006/001950 under 35 U.S.C. 371, filed Aug. 3, 2006 and published in Chinese, which claims the benefit of Chinese Patent Application NO. 200520128631.8, filed Sep. 29, 2005 in People's Republic of China.

FIELD OF THE INVENTION

This invention refers to a rubber conveyer belt, especially a heat resistant conveyer belt with side walls.

BACKGROUND ART

Conventionally, a heat resistant conveyer belt with side walls includes a base belt, cleats positioned on the base belt and skirt-boards positioned at two sides of the cleats. The cleats comprise a base and an incline board on the base. Because this kind of conveyer belt is made of rubber, its rigidity is lower. Its cleats and skirt-boards are only fixed on the base belt by means of secondary sulfuration, so that the belt is lack of heat resistant and aging resistant and so on. It results that they often get loose from the base belt, which decreases the life time of the conveyer belt and increases its cost.

THE SUMMARY OF THE INVENTION

This invention aims at solving such a prior technical problem that cleats and skirt-boards easily get loose from a base belt and discloses a heat resistant conveyer belt with side walls whose cleats and skirt-boards fixed on the base belt firmly.

In order to solve the technical problem said above, the heat resistant conveyer belt with side walls according to the invention comprises a base belt and cleats positioned on the base belt, wherein metal frameworks are embedded in said cleats and the cleats are fixed on said base belt through fasteners.

Furthermore, according to this invention, the conveyer belt also comprises skirt-boards positioned at two sides of said cleats and fixed on said base belt through fasteners, and metal sheet is embedded in the base of said skirt-boards.

Still further, for preventing the cleats from breaking, according to this invention, the cross sectioned shape of the metal frameworks fits that one of the cleats.

Still further, according to this invention, the fasteners are bolts.

This invention has following advantages:

The cleats and the skirt-boards are respectively embedded with metal frameworks and sheet within, so that they can be fixed on the base belt through fasteners, thereby preventing themselves from getting loose from the base belt under high temperature, increasing the life time of the conveyor belt and decreasing its cost.

Wherein, No 10: base belt
No 20: cleat
No 21: incline board
No 22: base
No 23: metal framework
No 30: skirt-board
No 31: metal sheet
No 40: bolt

DETAILED DESCRIPTION OF THE INVENTION

Figure 1:
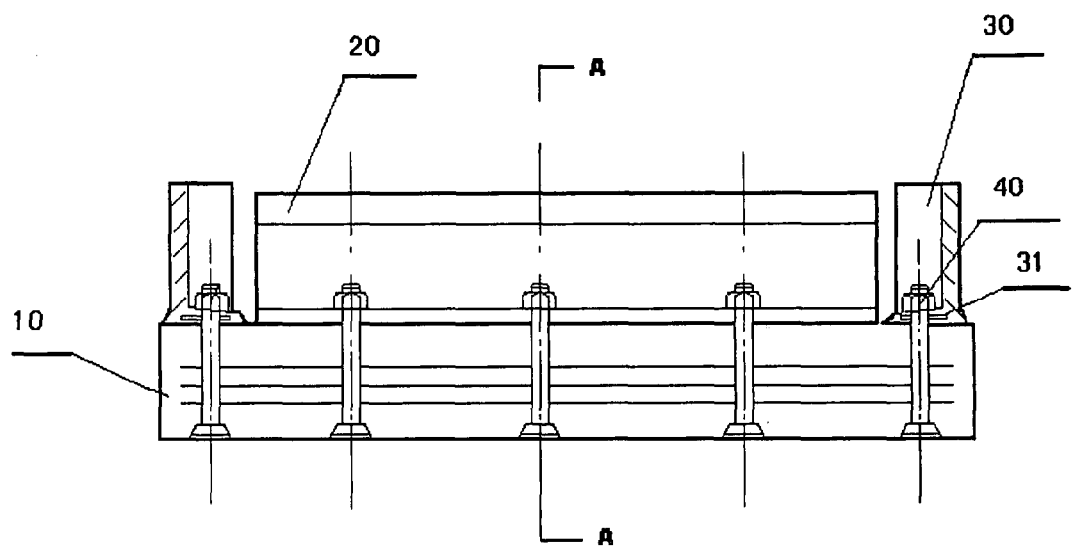
FIG. 1: is a structural view of the invention.
Figure 2:
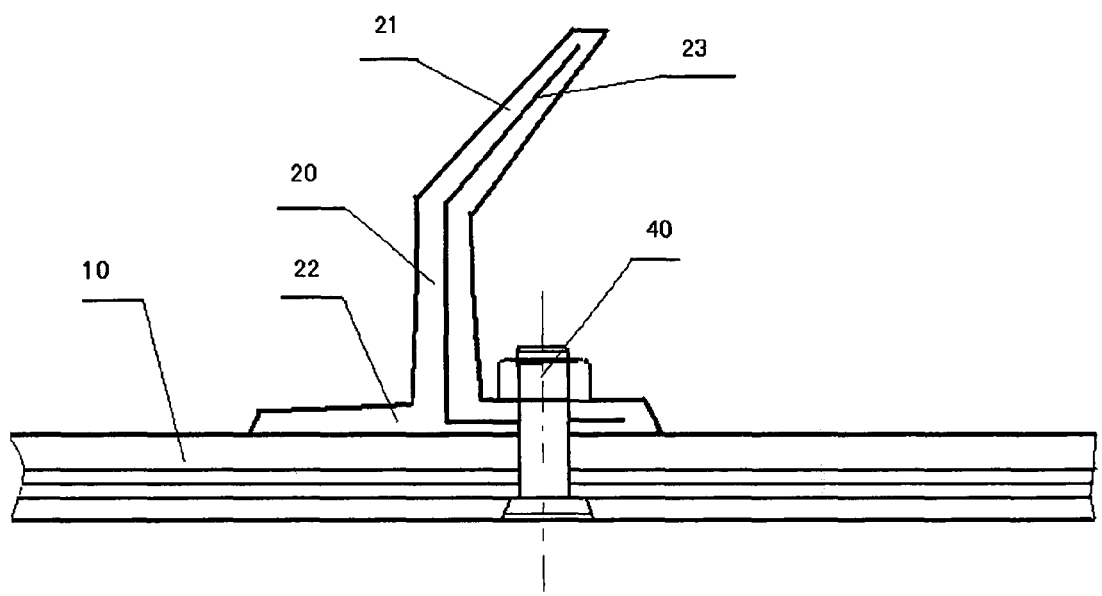
FIG. 2: is a cross sectioned view taken along lines A-A of FIG. 1.

As showed in FIGS. 1 and 2, the heat resistant conveyer belt with side walls according to the invention comprises base belt 10 and cleats 20 positioned on the base belt. The cleats 20 comprise a base 22 and a incline board 21 on the base, and metal frameworks 23 are embedded in the cleats 20, whose cross sectioned shapes are adapted. The base of metal frameworks 23 can also be embedded in the base 22 of cleats 20. The base 22 and metal frameworks 23 are fixed on the base belt 10 through bolts 40. According to this invention, the conveyer belt 10 also comprises skirt-boards 30 positioned at two sides of the cleats 20 and fixed on base belt 10 through bolts 40. A metal sheet 31 is embedded in the base of the skirt-boards 30.

It is to be understood that the form of this invention herewith shown and described is to be taken as a preferred example of the same, and that this invention is not to be limited to the exact shown in the accompanying drawings or described in this specification as various changes in the details may be resorted to without departing from the spirit of the invention.

We claim:

1. A heat resistant conveyer belt with side walls comprising:
   a base belt and cleats positioned on the base belt, wherein metal frameworks are embedded in said cleats and the cleats are fixed on said base belt through a first type of fasteners, and
   skirt-boards positioned at two sides of said cleats and fixed on said base belt through a second type of fasteners, and wherein a metal sheet is embedded in the base of said skirt-boards.

2. The heat resistant conveyer belt as defined in claim 1, wherein the cross sectional shape of said metal frameworks is adapted to the cross sectional shape of said cleats.

3. The heat resistant conveyer belt as defined in claim 1, wherein the cross sectional shape of said metal frameworks is adapted to fit the cross sectional shape of said cleats.

4. The heat resistant conveyer belt as defined in claim 3, wherein said second type of fasteners are bolts.

5. The heat resistant conveyer belt as defined in claim 1, wherein said first type of fasteners are bolts.

6. The heat resistant conveyer belt as defined in claim 5, wherein said bolts go through both the bases of the metal frameworks and bases of the cleats.

7. The heat resistant conveyer belt as defined in claim 6, wherein the conveyer belt is made of rubber.

8. The heat resistant conveyer belt as defined in claim 7, wherein the conveyer belt, the cleats and the skirt-boards are vulcanized together.

* * * * *